July 9, 1946.  J. W. McFARLANE ET AL  2,403,892
PHOTOGRAPHING DEVICE
Filed Oct. 27, 1944  2 Sheets-Sheet 1
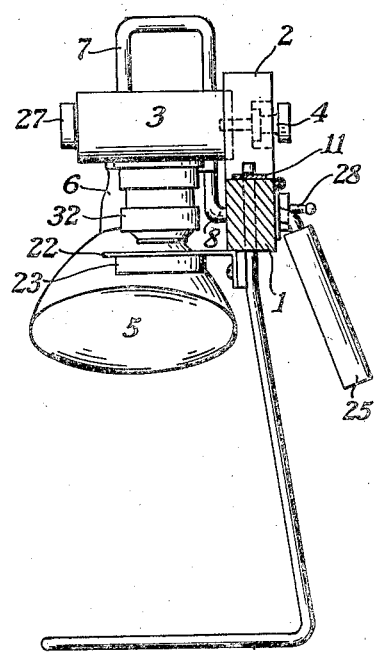
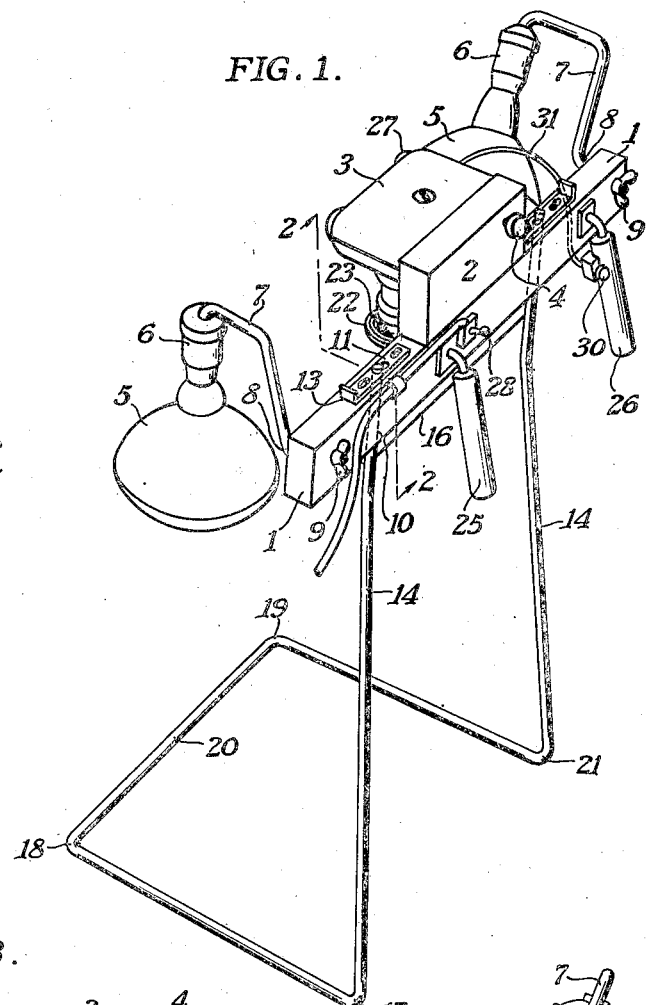
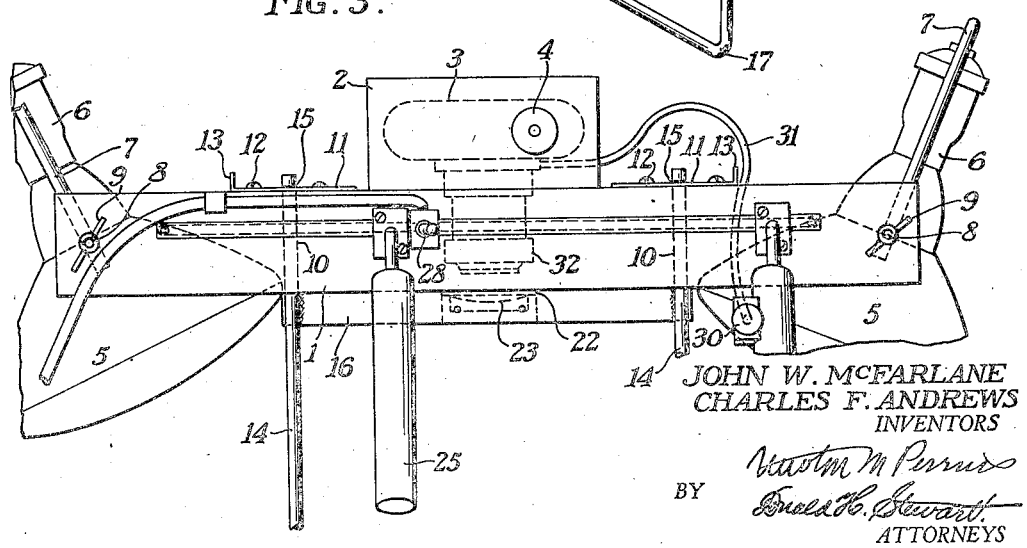
JOHN W. McFARLANE
CHARLES F. ANDREWS
INVENTORS
BY
ATTORNEYS July 9, 1946.  J. W. McFARLANE ET AL  2,403,892
PHOTOGRAPHING DEVICE
Filed Oct. 27, 1944   2 Sheets-Sheet 2
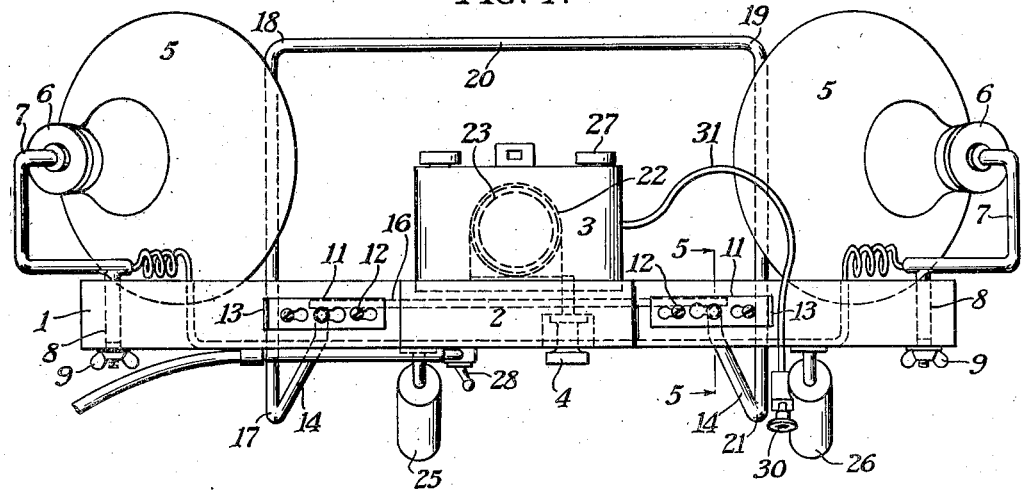
JOHN W. McFARLANE
CHARLES F. ANDREWS
INVENTORS
BY
ATTORNEYS Patented July 9, 1946

2,403,892

UNITED STATES PATENT OFFICE 2,403,892

PHOTOGRAPHING DEVICE

John W. McFarlane and Charles F. Andrews, Rochester, N. Y., assignors to Eastman Kodak Company, Rochester, N. Y., a corporation of New Jersey Application October 27, 1944, Serial No. 560,627

2 Claims. (Cl. 88—24)

This invention relates to photography and particularly to a photographic outfit which will enable relatively unskilled operators to make photographs of objects at fixed magnification under fixed lighting conditions. One object of our invention is to provide an apparatus which can be readily supported by an operator to take pictures of small objects, such as tools, flowers and the like, and to provide a means which will simplify producing such pictures. Another object of our invention is to provide a hand-held camera support so arranged that it can be used with either one or both hands of an operator and to provide a support in which the various cooperating parts are all carried in convenient operating positions so as to reduce the number of operations in taking a picture to a minimum. Another object of our invention is to provide a device which is readily portable for photographing small objects and to provide a single self-contained unit which will carry all of the necessary parts for producing exposures. A still further object of our invention is to provide a support carrying frames which both define the field of an exposure as well as the focus of the camera. Other objects will appear from the following specification, the novel features being particularly pointed out in the claims at the end thereof.

In the drawings wherein like reference characters denote like parts throughout:

Fig. 1 shows a perspective view of a photographic outfit constructed in accordance with and embodying a preferred form of our invention;

Fig. 2 is a section taken on line 2—2 of Fig. 1;

Fig. 3 is a rear view of a portion of the device shown in Fig. 1 but with the parts on an enlarged scale;

Fig. 4 is a top plan view of the device shown in Fig. 1 also on an enlarged scale;

Fig. 5 is a fragmentary sectional detail on line 5—5 of Fig. 4;

Fig. 6 is a fragmentary perspective view of a different embodiment of our invention from that shown in the preceding figures; and Fig. 7 is a perspective view of a modified form of the view locating and focus determining frame structure.

In order to provide a photographing outfit which can be successfully and easily used by relatively inexperienced photographers, we have provided a device in which most of the usual variables in making a photograph can be fixed. That is, we provide a camera which can conveniently be always operated at a fixed speed and a given aperture, since the lighting conditions can always be maintained the same and in which separate focusing for each photograph is unnecessary. To accomplish this, we prefer to provide a support in the form of an elongated base member 1, which is preferably made long and narrow. Near the central part of this base member there is a means 2 for supporting a camera 3, this means carrying a tripod screw 4 by which the camera is attached to the block. On each side of the camera 3 are mounted lamps, such as flood lamps 5, these being carried by suitable sockets 6, the sockets in turn being carried by brackets 7. The brackets 7 and lamps 5 are so shaped that they may be swung upon shaft portions 8 which pass through the ends of the base 1 and they may be fastened at any desirable angle by means of the wing nuts 9. The position and shape of the brackets 7 is such that there is but little change in the balance of the support 1 regardless of the position into which these brackets are swung.

On each side of the camera 3 we provide rod supporting apertures 10 as shown in Fig. 5, these apertures passing through the support 1. On the upper side of the support, we provide bayonet-type latches in the form of plates 11 mounted to slide on studs 12. Flanges 13 may be provided for convenience for sliding these bayonet latches. The rod apertures 10 are designed to support one or more focus determining rods 14, these rods having notches 15 to be engaged by the bayonet latch plate 11 and preferably having a cross bar 16 for locating the rods in the base 1 as shown in Fig. 5. In the form of the invention shown in the first four figures the focus determining rod may consist of a rod member bent at 17 outwardly, being bent again at 18 and 19 to form a frame designated broadly as 20 which will both define the field of view of the lens and a particular focal distance for the lens. The rod is also bent upwardly at 21 so that, in effect, it provides a U-shaped frame member which can be attached to the support 1 in the manner described. This rod member carries a cross bar 16 between the two ends 14 of the rod, this cross bar supporting a frame 22, best shown in Fig. 3, the frame carrying a supplemental lens 23 of such power that the camera objective will be focused on an object lying within the frame 20.

While the frame 20 may be used as a stand which will support the camera 3 above an object to be photographed, we provide a pair of unsymmetrically arranged handles 25 and 26, one of these handles 25 being mounted near the center of gravity of the support 1 with its various attachments and the other handle 26 being mounted nearer one end of the support 1. The location of these handles is important, because it enables an operator to support the entire photographing outfit readily with one hand by grasping the handle 25 and to use the handle 26 for guiding the base 1 with its attachments into the desired position. In addition, while holding the outfit by the handle 25, it is a simple matter to wind film through the camera by means of the usual winding knob 27 on the camera 3.

We prefer to provide a lamp switch 28 adjacent the handle 25 so that the lamps may be simultaneously turned on when a photograph is to be made or an object is to be illuminated. We also prefer to mount an operating plunger 30 for a cable release 31 attached to the camera shutter 32 for operating the shutter and to provide the operating plunger 30 either directly on the handle 26 or on an adjacent part of the support 1. Thus the operations of lighting the lamp and making the exposure can be carried out while steadying the outfit by holding it with both handles 25 and 26.

The operation of taking pictures with the outfit as thus far described is extremely simple. Since the illumination of the flood lamps 5 is always the same for the fixed distance determined by the frame 20, an operator merely supports the outfit by the handle 25 steadying it with the handle 26 and lowers the frame 20 until it partially surrounds the object to be photographed and until it approaches or lies in substantially the same plane as the article to be photographed. When so positioned, the light switch 28 is turned on and the cable release plunger 30 is depressed, thus making an exposure. This operation can be carried out by laying an article to be photographed on a suitably colored card and allowing the supporting rod 14 with its frame 20 to rest on the table with the article properly located in the frame 20.

We prefer to provide a series of different size frames 20, each different size, of course, having different length arms for engaging the support 1. Each frame cross bar 16 will carry a supplementary lens 23 of the correct power to focus an object encircled by the frame on the film. Each time a new frame or focus and view determining rod is applied to the base 1, the camera will therefore be automatically focused by the addition of the supplementary lens.

While we have shown the base 1 to be constructed of light wood, we would prefer this to be made of a light-weight metal casting, although the material of which the support is made is not particularly important.

In Fig. 6 we have shown a slightly different embodiment of focus determining frame and in this instance the frame is particularly designed for extremely small articles. In this form of our invention there is a pair of rods 54 which may be carried on one end by a supporting member 55 preferably of a neutral gray color. The rods 54 support cross bars 56 and 57, the former cross bar carrying a glass panel 58 which may support the work W to be photographed. In order to define the field of view encompassed by the camera we provide a generally U-shaped member 59 which can also conveniently be made of metal or a transparent substance. Thus an article W to be photographed is held in a position in which it may be illuminated by the lamps 60, these lamps being carried by the adjustable brackets 61 carried by the support 62 on which the camera 63 is also carried.

The upper cross bar 57 supports a supplementary lens 64 of the desired power and, since the rods 54 are accurately positioned on the base member 62 in a manner similar to that described for the embodiment shown in the first four figures, the supplementary lens 64 is always coaxially positioned with respect to the camera lens carried by the shutter 66. We may provide baffle plates 67 on each side of the camera to prevent direct rays from the lamps 60 from striking the camera.

One particularly desirable feature of this last-described embodiment of our invention is that, since the supporting board 55 is preferably painted a neutral gray and since a glass panel 58 supporting the work W to be photographed is used above this base, the lamps illuminate the background and provide a picture of the work W which is clearly set out from the background, and the shadows cast by the work W are beyond the field of view. Of course this type of device cannot be used in many instances, as where it is necessary to photograph a piece of work being turned on a lathe, for instance, or some other part which is inseparable from its surroundings. In such a case, we prefer to use the embodiment of our invention shown in Fig. 1 in which the model frame 20 defines the field of view and focus.

In Fig. 7 we have shown a slight modification of our field defining frame and, in this instance, two downwardly extending rods 70 are employed, these rods being connected by a crosspiece 71 carrying a supplemental lens 72. At the lower end of these rods there are turned-over portions 73 to which the end members 74 of a generally U-shaped frame 75 are attached by means of pivots 76. The shape of this hinged connection is such that the U-shaped frame may be swung into a position in which it will define the field of view and, if necessary or convenient, before taking the picture the U-shaped member 75 may be swung out of its operating position defining the field of view and into the position shown in this figure. Sleeve 77 may be slid over the hinged joint to hold the frame 75 in an operative position. It is obvious that the locating frames can be made in various sizes and shapes and that by selecting the proper supplemental lens these locating frames can be interchangeably used on the support such as 1 or 62, without any alteration in the camera.

The operation of using these devices is substantially the same with either the open type of frame shown in Fig. 1 or the glass panel type of frame shown in Fig. 6. Whatever the type of frame the complete outfit can be supported or steadied by the handles 25 and 26 and, since the light switch 28 and the shutter release 30 are conveniently held adjacent these handles, it is only necessary to frame the article to be photographed, operate the switch 28 to light lamps, and press the shutter release 30 to make an exposure. By using known types of flood lights for lamps 5 and 60, we are able to take pictures at most magnifications at a small stop, as for instance f/11, and that a relatively fast shutter speed, such as $1/50$ of a second, both the stop and exposure time being desirable because the stop affords sufficient depth of field to take care of objects or parts of objects which lie slightly to either side of the plane of the frame 20 or 58 and because the shutter speed of $1/50$ of a second is sufficiently short to permit an operator to take a picture while holding the outfit in his hands without shaking the camera. In both the embodiments of our invention we may point out that by having one of the handles 25 at substantially the center of gravity of the outfit, it is possible to support the outfit by one hand without undue difficulties, this being useful not only in taking pictures, but particularly for winding film between pictures. The handle 26 also is usually used to help support the outfit because of the added steadiness that the use of two handles usually gives. We have found, however, that it is extremely desirable to provide the handles of the base in such a position that the outfit can be properly balanced either with one hand or with both. While the handle 25 is not at the exact center of gravity of the outfit, it nevertheless is sufficiently close to enable an operator to position and move the outfit with one hand.

While not necessary, it is convenient to leave the camera objective focused on infinity and provide the supplemental lenses of a power to bring into sharp focus, an object located by the focus and field-indicating frame. This avoids the necessity of ever altering the focus of the camera lens, thereby reducing manual adjustments for different frames.

While we have described and illustrated preferred embodiments of our invention, it is obvious that various changes can be made in the shape and construction of the various parts without departing from our invention as defined in the following claims.

What we claim is:

1. A device for use in the rapid photographing of small objects including a support adapted to be supported by hand and comprising a long, thin, rod-like base, a screw for attaching a camera with its lens and shutter to a medial portion of said base and with the lens axis transverse to the length of the base, a pair of lamps, lamp brackets movably mounted on the ends of the base and to both sides of the camera-attaching screw, handles for supporting said base extending from the base at an angle thereto, a lamp switch carried by the base adjacent a handle thereof, a shutter release carried by the base adjacent a handle thereof, a focus and field determining frame having rod ends detachably fastened to the frame, one on each side of the screw for attaching the camera, said focus and field determining frame including a U-shaped frame formed at substantially right angles to the lens axis and a supplementary lens carried by the rod ends and positioned for alignment with the lens axis whereby said frame may be positioned, the switch may be operated and the shutter may be released while said frame is supported by the handles.

2. A device for the rapid photographing of small objects as defined in claim 1 characterized by the handles being located beneath the support at substantially right angles thereto and being unsymmetrically located thereon, one handle being located at substantially the center of gravity and the other near one end thereof.

JOHN W. McFARLANE.
CHARLES F. ANDREWS.